United States Patent [19]

Walker et al.

[11] 4,241,843
[45] Dec. 30, 1980

[54] LINED METAL TANK WITH HEAT SHIELD AND METHOD OF MAKING SAME

[75] Inventors: Robert Walker, Pawtucket, R.I.; Joseph A. Lane, Tauton, Mass.

[73] Assignee: Amtrol Inc., West Warwick, R.I.

[21] Appl. No.: 46,763

[22] Filed: Jun. 8, 1979

[51] Int. Cl.³ .................. B23K 35/38; B65D 8/06; B65D 90/08; B65D 90/38
[52] U.S. Cl. .................. 220/5 A; 29/455 R; 219/312; 220/75; 220/468; 220/902; 228/184; 228/222
[58] Field of Search .............. 220/444, 452, 902, 5 R, 220/5 A, 468, 469, 466, 81 R, 421, 75, 80; 29/455 R; 228/184, 222, 215; 138/149; 219/312; 126/361, 363; 128/215, 222, 184

[56] References Cited

U.S. PATENT DOCUMENTS

| 845,760 | 3/1907 | Coffin . | |
|---|---|---|---|
| 1,549,721 | 8/1925 | Kraft | 220/80 |
| 2,113,060 | 4/1938 | Sandberg . | |
| 2,146,381 | 2/1939 | Rheem | 220/468 X |
| 2,263,021 | 11/1941 | Uecker | 220/81 R X |
| 2,317,734 | 4/1943 | Cook | 220/75 X |
| 2,412,271 | 12/1946 | Kercher . | |
| 2,542,543 | 2/1951 | Losee | 219/312 X |
| 2,551,484 | 5/1951 | Branning | 220/75 X |
| 2,587,840 | 3/1952 | Gruetjen . | |
| 2,729,313 | 1/1956 | Ernestus | 220/5 A X |
| 2,758,367 | 8/1956 | Dougherty . | |
| 2,820,427 | 1/1958 | Chyle et al. . | |
| 2,970,719 | 2/1961 | Brady, Jr. . | |
| 3,253,731 | 5/1966 | Fink et al. . | |
| 3,313,020 | 4/1967 | Krauskopf . | |
| 3,326,141 | 6/1967 | Graves | 220/444 X |
| 3,328,496 | 6/1967 | Graves . | |
| 3,358,118 | 12/1967 | Mather et al. | 219/312 X |
| 3,614,967 | 10/1971 | Royston | 138/149 X |
| 4,099,641 | 7/1978 | Schiedat | 220/444 |

*Primary Examiner*—Allan N. Shoap
*Attorney, Agent, or Firm*—Fisher, Christen & Sabol

[57] ABSTRACT

A metallic tank having an insulated interior is disclosed which exhibits unique features to enable the welding of the tank sections together without damage to the insulation. The insulating lining is installed in the multi-piece metallic tank prior to the welding of the tank sections together. A heat shield is provided between the weld area and the insulating liner to prevent damage to the liner during the welding process. The method of assembly allows the economical and rapid fabrication of lined metallic tanks without fear of damaging the lining material.

14 Claims, 2 Drawing Figures

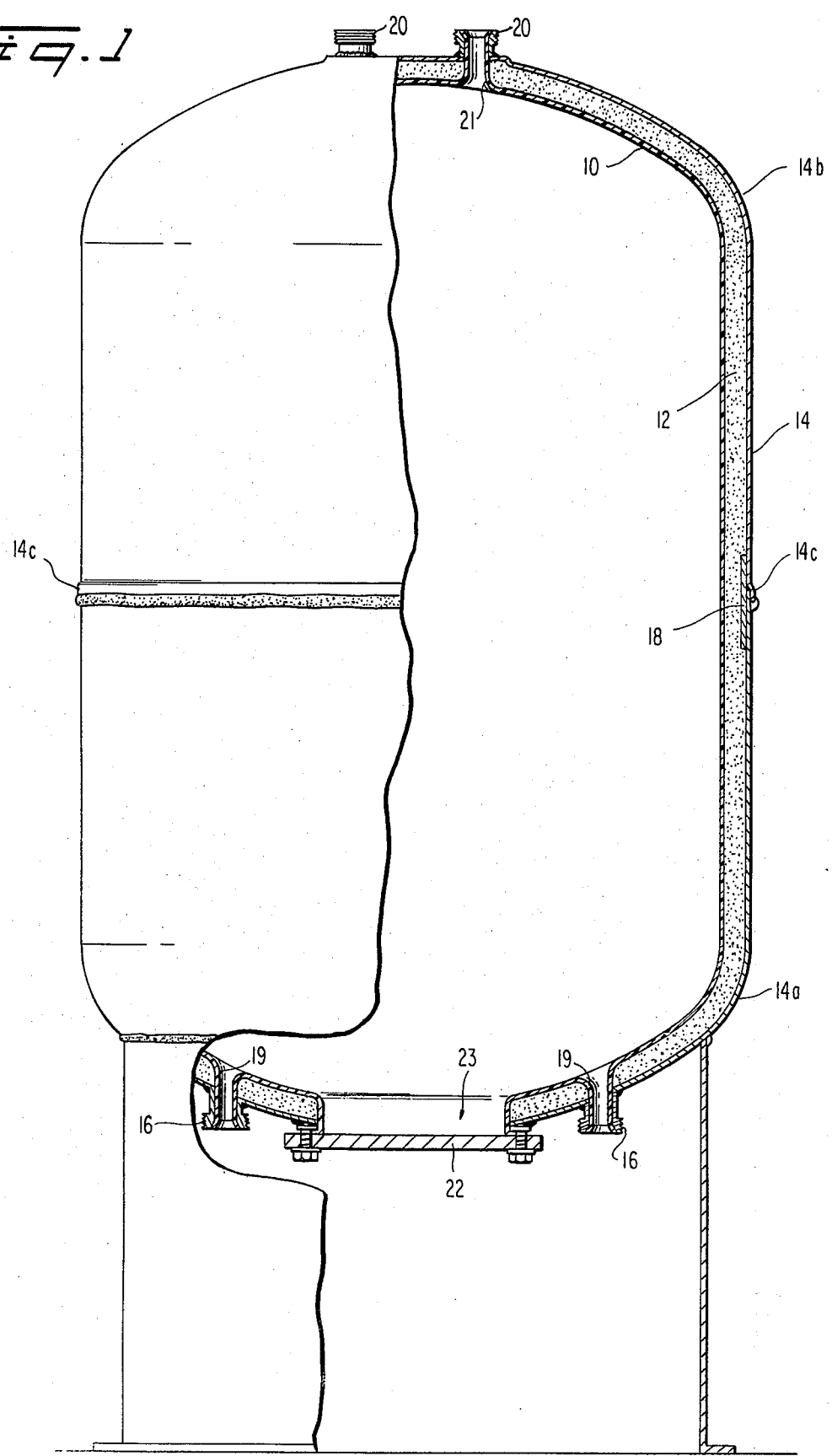

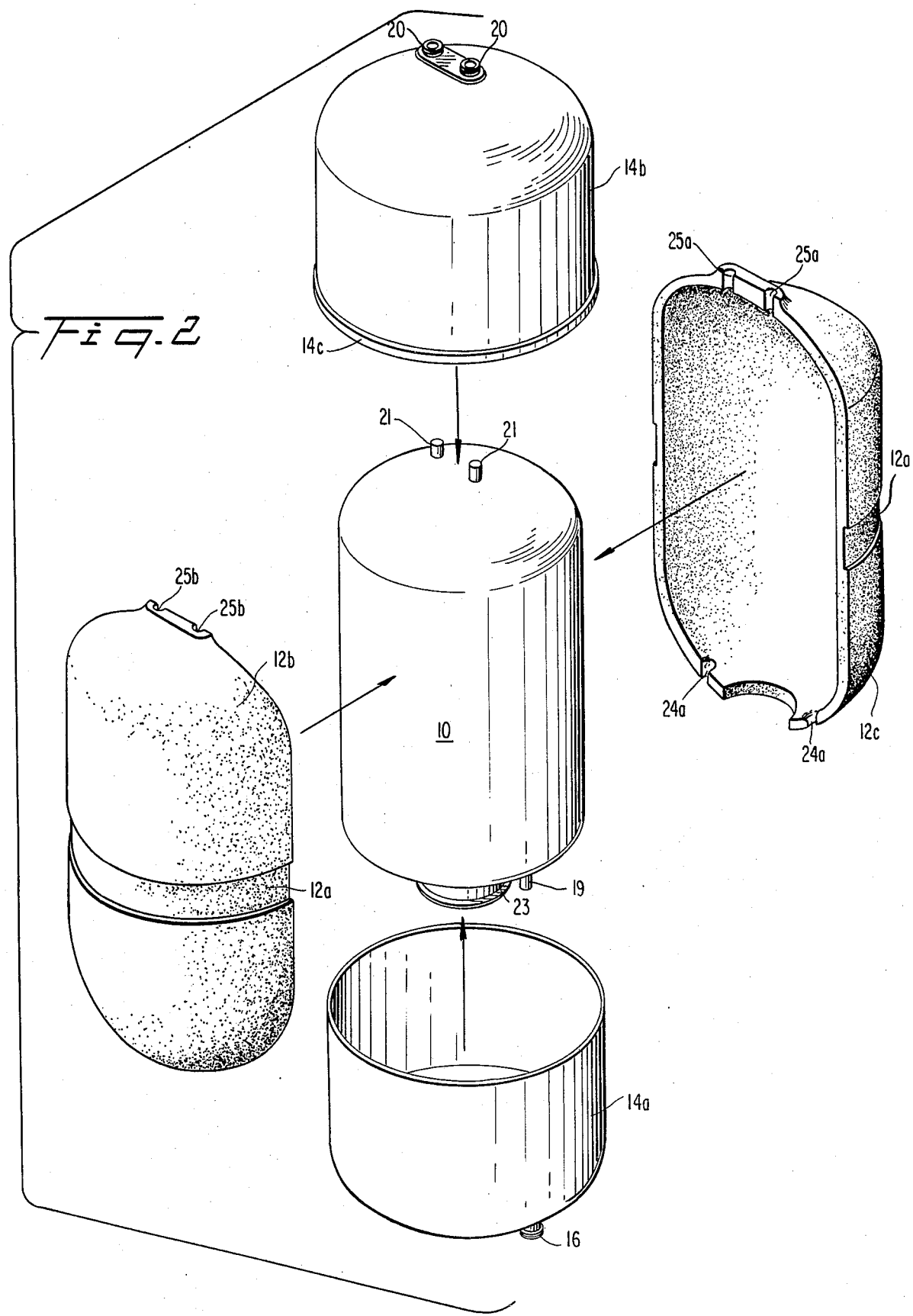

LINED METAL TANK WITH HEAT SHIELD AND METHOD OF MAKING SAME

FIELD OF THE INVENTION

This invention relates to lined metallic tanks and methods of making same, more particularly those methods involving welding a multi-piece metallic tank without damaging the lining material.

BRIEF DESCRIPTION OF THE PRIOR ART

The tank manufacturing industry has long been plagued with the problems associated with forming a multi-piece metallic tank structure having a lining on its interior. Since such tanks have achieved widespread usage in virtually every field, including hot water storage tanks, hot water heating tanks, accumulators for hot water heating systems, liquid transportation systems, etc., the problem of economically fabricating such tanks is one of substantial magnitude. Due to the enclosed nature of such vessels, they are more easily fabricated in several sections which are subsequently welded together. However, when a lining is associated with the tank, the problem of welding the tank sections together is magnified, since it must be done without destroying the continuity of the interior lining. Any break or discontinuity in the lining will results in the eventual contamination of the tanks' contents and corrosion of the metal tank.

Several attempts have been made to overcome this problem. One solution has been to apply the coating to the metal tank after it has been welded together, as exemplified in U.S. Pat. No. 2,758,367. However, this drastically limits the types of coatings that may be applied to the interior of a closed vessel. Such a process is also time consuming and expensive, and there is no assurance that the lining completely covers the interior of the vessel as intended.

Where a foamed material is utilized as the insulating lining, it may be foamed in situ. This involves the use of an interior an exterior vessel wherein the foam is placed in the space between the two vessels. Processes utilizing these concepts are shown in U.S. Pat. Nos. 3,313,020 and 3,328,496. This process is more expensive since it requires the use of two vessels. The foam must also be foamed in small sections to allow for the complete escape of the gases generated by the foaming process and, therefore, this method is unduly time consuming when fabricating large vessels or tanks.

Another method of fabricating lined, multi-piece metallic vessels involves the use of a chill ring placed in the interior of the metallic vessel adjacent the weld area. The chill ring is usually an annular metal structure, which may or may not have a coating thereon, and serves to absorb the heat generated by the welding process such that it does not destroy the tank lining. The use of chill rings are well-known and are shown in U.S. Pat. Nos. 2,412,271 and 2,970,719. The drawbacks to this system are obvious, insofar as the use of a separate structure increases the cost and weight of the tank while serving effectively no useful purpose once the tank is welded together.

It is also known to utilize a rubber material as an insulating band installed adjacent to a welding area, as set forth in U.S. Pat. No. 2,587,840. However, the purpose of this insulating band is not to protect the lining of the tank since there is no lining in the area which the band is used, but to prevent the current generated by the electric welding process from jumping to an adjacent metallic wall. Other methods of fabricating welded vessels are set forth in U.S. Pat. Nos. 845,760; 2,113,060; 2,820,427; and 3,253,731.

SUMMARY OF THE INVENTION

The instant invention obviates the problems associated with the aforementioned prior art teachings and provides a method of making a lined metallic tank that is rapid, economical, and involves no extraneous elements which take up usable space in the tanks' interior. The tank according to the invention comprises a multi-piece metallic outer tank, an insulating liner of foam material (such as urethane foam), and a rigid plastic inner tank. A heat shield of high temperature silicone rubber is placed around the exterior of the insulating liner so as to be located between it and the metallic tank, at the location where the metallic outer tank sections are welded together. The urethane foam liner may have indentations therein to accomodate the heat shield such that the heat shield does not in any way enlarge the requisite dimensions of the tank. It has been found that the high temperature silicone rubber effectively insulated the urethane from the heat generated during the welding process such that the foam is in no way damaged thereby.

To assemble the tank, the two vertically divided halves of the urethane foam insulation are placed around the one piece inner plastic tank and this assembly is placed in a first portion of the metallic tank, preferably a lower half. A heat shield, preferably of high temperature silicone rubber, is placed around the exterior of the insulating liner in an indentation provided adjacent the welding area. A second metallic portion is then placed over this structure and the metal tank portions are welded together.

BRIEF DESCRIPTION OF THE DRAWINGS

FIG. 1 is a side view, partially broken away of a lined metallic tank according to the invention.

FIG. 2 is an exploded, perspective view of the tank of FIG. 1.

DETAILED DESCRIPTION OF THE PREFERRED EMBODIMENT

The tank according to the instant invention is shown in FIG. 1 and comprises one-piece inner plastic tank 10, foam liner 12 and metallic tank 14. Plastic tank 10 may be made of any rigid or semi-rigid plastic material depending, of course, on the type of liquids with which the tank is intended to be used. Metallic tank 14 is shown as being comprised of lower and upper portions 14a and 14b, respectively, divided in a horizontal plane at its approximate mid-point. This construction, however, is merely for the purposes of illustration and it is understood that the tank may be constructed of any number of portions divided either horizontally, vertically, or at any other orientation. The lower tank portion is shown as having two connecting means 16 which may be connected to the system utilized for filling or emptying the tank, or if the tank is utilized in a fluid system of any sort, connection(s) 16 illustrates the means by which the tank is connected to such system. Connecting means 16 communicate with the interior of plastic tank 10. Nipples 19 of plastic tank 10 fit through the lower holes in the foam insulation halves 12c and 12b formed by lower slots 24a and 24b (not shown)

therein, respectively, and snuggly fit into and all of the way through connecting means 16. Suffice to say that it is not critical to the instant invention that the connecting means be located in the lower portion of the tank, and it may be located in any desired position.

As is illustrated in the Figures, insulating liner 12, which may be urethane foam, or any other foam material depending upon the use to which the tank is subjected, has an indentation 12a about its exterior periphery at the location of the juncture of the upper and lower metal tank portions. This is to accommodate heat shield 18, which is the form of an annular band and may be fabricated of high temperature silicone rubber such as that sold under the tradename of COHRLASTIC and available from Connecticut Hard Rubber Company, New Haven, Conn.

Upper tank portion 14b is shown having two connection means 20, which communicate with the interior of plastic tank 10. Nipples 21 of plastic tank 10 fit through the upper holes in foam insulation halves 12c and 12b formed by upper slots 25a and 25b therein, respectively, and snuggly fit into and all of the way through connecting means 20. Plate 22 is bolted onto the bottom port 23 of tank 10.

To assemble the tank, the one-piece inner plastic tank 10 is placed inside of the vertically divided foam insulation halves 12b and 12c and this assembly is placed into lower tank portion 14a. Although two halves 12b and 12c are shown, it is understood that insulating liner 12 may be divided vertically into several sections to facilitate handling, depending upon the size of the tank to be fabricated. High temperature silicone rubber heat shield 18 is then placed in peripheral notch 12a on the foam liner and fastened in position by any known means. Upper tank portion 14b is then placed over this assembly such that peripheral flange 14c rests on the upper edge of lower tank portion 14a, as shown. The assembly is then welded at the juncture of tank portion 14a and 14b by any known welding means. The heat shield 18 insulates urethane foam liner 12 from damage due to the heat generated during the welding process. The thusly assembled tank is then ready for usage.

Although the assembly method has been described in terms of a vertically oriented tank, the method according to this invention is equally applicable to a horizontally oriented tank. Also, metallic tank 14 may be divided into more than two sections as described, depending of course on the dimensions of the finished product.

It is understood that the foregoing description of the tank and method of making it are for illustrative purposes only and that various modifications can be made thereto without exceeding the scope of the appended claims.

We claim:

1. A metal tank assembly comprising:
   (a) a multi-section metallic outer tank wherein the sections are welded together;
   (b) a liner of insulating material disposed on the interior of said multi-section outer tank; and
   (c) heat shield means disposed between said outer tank and said insulating liner adjacent the welded junctions of said outer tank to prevent damage to, or destruction of said insulating liner caused by heat generated during the welding operation;
   (d) said liner having retaining means for securement of said heat shield means adjacent each welded junction.

2. The metal tank assembly as claimed in claim 1 further comprising an inner tank made of plastic material disposed inside of said insulating liner.

3. The metal tank assembly as claimed in claim 1 or 2 wherein said heat shield is made of a high temperature silicone rubber.

4. The metal tank assembly as claimed in claim 1, or 2 wherein said insulating liner is made of a urethane foam.

5. The metal tank assembly as claimed in claim 3 wherein said insulating liner is made of a urethane foam.

6. The metal tank assembly as claimed in claim 1 wherein said liner has an outer peripheral groove which is located along the welded junction or junctions and in which the heat shield means is disposed.

7. The metal tank assembly as claimed in claim 6 wherein the multi-section outer tank comprises upper and lower sections welded together in a generally horizontal plane, an inner tank made of plastic material is disposed inside of said insulating liner, and the heat shield is composed on two vertical sections.

8. The metal tank assembly as claimed in claim 7 wherein the heat shield is made of a high temperature silicone rubber, and the insulating liner is made of a urethane foam.

9. A method of making a tank having an insulating layer disposed between a multi-section metallic outer tank and a plastic liner tank comprising the steps of:
   (a) placing said insulating layer about said inner plastic tank such that it completely covers the exterior surface of said plastic tank, said insulating layer having an outer peripheral groove located along each formed junction of the sections of said multi-sectional metallic outer tank when said outer tank is assembled
   (b) placing the assembly of step (a) into a first section of said multi-section metallic tank, one of each pair of adjoining sections of said multi-sectional metallic tank having an outwardly protruding lip which overlaps the rim of the other section of said pair of sections of said multi-sectional metallic tank;
   (c) placing an insulating heat shield in each outer peripheral groove of said insulating layer, each heat shield contacting said metallic outer tank and overlapping the area of the respective adjacent junction of each pair of sections;
   (d) placing at least one additional section of said multi-section tank over said insulating layer such that said heat shield is between the juncture of the metallic tank sections and the insulating layer; and
   (e) welding said metallic sections together.

10. The method as claimed in claim 9 wherein the insulating heat shield is made of silicone rubber.

11. The method as claimed in claim 10 wherein the insulating layer is made of urethane foam.

12. The method as claimed in claim 11 wherein the multi-section outer tank comprises upper and lower sections welded together in a generally horizontal plane.

13. In a method of making the metallic tank wherein a plurality of metallic sections are welded together surrounding a lining of insulating material on the interior of the tank, the improvement comprising the step of inserting a heat shield between the insulating lining and the juncture at which the sections are welded together before the welding step to prevent damage to the insulating layer due to the heat generated by the welding process, said insulating lining having retaining means for securement of said heat shield adjacent said juncture.

14. In a lined metal tank having a multi-section metallic tank of welded construction with an insulating lining disposed on the interior surface of the tank, the improvement comprising an insulating heat shield between the insulating lining and the juncture at which the multi-section tank is welded together to prevent damage to the insulating layer due to the heat generated by the welding process, said insulating lining having retaining means for securement of said heat shield adjacent said juncture.

* * * * *